United States Patent
Llorca et al.

(10) Patent No.: US 9,578,099 B2
(45) Date of Patent: Feb. 21, 2017

(54) DEVICES AND METHODS FOR CONTENT DISTRIBUTION IN A COMMUNICATIONS NETWORK

(71) Applicant: Alcatel Lucent USA, Inc., Murray Hill, NJ (US)

(72) Inventors: Jaime Llorca, Red Bank, NJ (US); Antonia Tulino, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 165 days.

(21) Appl. No.: 14/502,239

(22) Filed: Sep. 30, 2014

(65) Prior Publication Data

US 2015/0207896 A1 Jul. 23, 2015

Related U.S. Application Data

(60) Provisional application No. 61/930,072, filed on Jan. 22, 2014.

(51) Int. Cl.
*G06F 15/167* (2006.01)
*H04L 29/08* (2006.01)
(Continued)

(52) U.S. Cl.
CPC ..... *H04L 67/1097* (2013.01); *G06F 17/30902* (2013.01); *H04L 43/045* (2013.01); *H04L 43/062* (2013.01); *H04L 45/14* (2013.01); *H04L 67/06* (2013.01); *H04L 67/2833* (2013.01); *H04L 67/2842* (2013.01); *H04L 67/2847* (2013.01);
(Continued)

(58) Field of Classification Search
CPC .... H04L 29/08; H04L 12/721; H04L 67/1097; H04L 43/045; H04L 67/2833; H04L 67/2842; H04L 67/32; H04L 67/06; H04L 43/062; H04L 67/327; H04L 67/36; H04L 67/2847; H04L 45/14; G06F 17/30902
(Continued)

(56) References Cited

U.S. PATENT DOCUMENTS

| | | | |
|---|---|---|---|
| 7,916,665 B2 * | 3/2011 | Le Bars | H04L 45/04 370/252 |
| 8,705,407 B2 * | 4/2014 | Thai | H04K 3/00 370/255 |
| 2008/0002725 A1 * | 1/2008 | Alicherry | H04L 45/04 370/401 |

OTHER PUBLICATIONS

Network Coding Based Schemes for Imperfect Wireless Packet Retransmission Problems: A Divide and Conquer Approach Zhenguo Gao Published Aug. 19, 2010.*

(Continued)

*Primary Examiner* — Tauqir Hussain
(74) *Attorney, Agent, or Firm* — Harness, Dickey & Pierce, P.L.C.

(57) ABSTRACT

According to at least one example embodiment, a method for transmitting data files in a network includes receiving requests from user devices for packets of the data files. The method includes constructing a conflict graph such that each packet requested by each user device is represented by a distinct vertex in a plurality of vertices of the conflict graph, the constructing being based on which of the plurality of vertices represent a same requested packet and which requested packets are stored in caches belonging to the user devices. The method includes coloring the plurality of vertices of the conflict graph to label the requested packets. The method includes combining the packets represented by vertices having a same color. The method includes sending the combined packets.

14 Claims, 11 Drawing Sheets

(51) Int. Cl.
*G06F 17/30* (2006.01)
*H04L 12/26* (2006.01)
*H04L 12/721* (2013.01)

(52) U.S. Cl.
CPC ............. *H04L 67/32* (2013.01); *H04L 67/327* (2013.01); *H04L 67/36* (2013.01)

(58) Field of Classification Search
USPC .......................................................... 709/213
See application file for complete search history.

(56) References Cited

OTHER PUBLICATIONS

Efficient Algorithms for Index Coding Mohammad Asad R. Chaudhry and Alex Sprintson Texas A&M University, College Station, Texas Publish date: 2008.*
J. Mingyue et al. "On the average performance of caching and coded multicasting with random demands," *2014 11th International Symposium on Wireless Communications Systems, IEEE.* Aug. 2014. XP 32666570.
M. Ji, A.M. Tulino, J. Llorca, and G. Caire, "Order optimal coded caching-aided multicast under zipf demand distributions," Feb. 2014. XP55178891.
Urs Niesen and Mohammad Ali Maddah-Ali, "Coded caching with nonuniform demands," arXiv preprint arXiv:1308.0178, 2013. XP 55178844.
J Llorca, A.M. Tulino, K Guan, J Esteban, M Varvello, N Choi, and D Kilper, "Network-coded caching-aided multicast for efficient content delivery," ICC, 2013 Proceedings IEEE. IEEE, 2013. XP 32522408.
M. Asad, R. Chaudhry, and A. Sprintson. "Efficient algorithms for index coding." *Computer Communications Workshops,* 2008. Apr. 2008. XP 31273967.
Z. Gao et al. "Network coding based schemes for imperfect wireless packet retransmission problems: A divide and conquer approach." *Wireless Personal Communications, Kluwer Academic Publishers, DO.* vol. 62(4). Aug. 2010. XP 35004245.
M. Ji, A.M. Tulino, J. Llorca, and G. Caire, "Order optimal coded delivery and caching: Multiple groupcast index coding," arXiv:1402.4572, 2014. Feb. 2014. XP 80006426.
International Search Report (PCT/ISA/210) mailed Apr. 8, 2015 for corresponding International Application No. PCT/US2015/011504.

Written Opinion of the International Searching Authority (PCT/ISA/237) mailed Apr. 8, 2015 for corresponding International Application No. PCT/US2015/011504.
International Search Report (PCT/ISA/210) mailed Apr. 9, 2015 for corresponding International Application No. PCT/US2015/011506.
Written Opinion of the International Searching Authority (PCT/ISA/237) mailed Apr. 9, 2015 for corresponding International Application No. PCT/US2015/011506.
Cisco, "The Zettabyte Era-Trends and Analysis," 2014.
M. Ji, G. Caire, and A. F. Molisch, "The throughput-outage tradeoff of wireless one-hop caching networks," arXiv preprint arXiv:1312.2637, 2013.
M. Ji, G. Caire, and A.F. Molisch, "Fundamental limits of distributed caching in d2d wireless networks," arXiv preprint arXiv:1304.5856, 2013.
M.A. Maddah-Ali and U. Niesen, "Fundamental limits of caching," arXiv preprint arXiv:1209.5807, 2012.
Mohammad Ali Maddah-Ali and Urs Niesen, "Decentralized caching attains order-optimal memory-rate tradeoff," arXiv preprint arXiv:1301.5848, 2013.
P. Gupta and P.R. Kumar, "The capacity of wireless networks," *Information Theory,* IEEE Transactions. 1999.
Y. Birk and T. Kol, "Informed-source coding-on-demand (iscod) over broadcast channels," 1998, *IEEE.*
S. A. Jafar, "Topological interference management through index coding," arXiv preprint arXiv:1301.3106, 2013.
A. Blasiak, R. Kleinberg, and E. Lubetzky, "Index coding via linear programming," arXiv preprint arXiv:1004.1379, 2010.
M. Ji, G. Caire, and A. F. Molisch, "Wireless device-to-device caching networks: Basic principles and system performance," arXiv preprint arXiv:1305.5216, 2013.
S. Gitzenis, GS Paschos, and L. Tassiulas, "Asymptotic laws for joint content replication and delivery in wireless networks," Arxiv preprint arXiv:1201.3095, 2012.
N. Golrezaei, A.F. Molisch, A.G. Dimakis, and G. Caire, "Femtocaching and device-to-device collaboration: A new architecture for wireless video distribution," arXiv:1204.1595v1, 2012.
K. Shanmugam, A. G. Dimkakis, and M. Langberg, "Local graph coloring and index coding," arXiv preprint arXiv:1301.5359, 2013.
I. Haviv and M. Langberg, "On linear index coding for random graphs," arXiv:1107.0390v1. 2011.
International Preliminary Report on Patentability dated Aug. 4, 2016 from corresponding International Application PCT/US2015/011504.
International Preliminary Report on Patentability dated Aug. 4, 2016 in corresponding International Application PCT/US2015/011506.

* cited by examiner

DEVICES AND METHODS FOR CONTENT DISTRIBUTION IN A COMMUNICATIONS NETWORK

CROSS-REFERENCE TO RELATED APPLICATIONS

This application claims priority under 35 U.S.C. §119(e) to provisional U.S. application No. 61/930,072 filed on Jan. 22, 2014, the entire contents of which are incorporated herein by reference.

BACKGROUND

Currently, content distribution networks (CDNs) face capacity and efficiency issues associated with the increase in popularity of on-demand audio/video streaming. One way to address these issues is through network caching and network coding. For example, conventional content distribution network (CDN) solutions employ centralized algorithms for the placement of content copies among caching locations within the network. Conventional solutions also include cache replacement policies such as LRU (least recently used) or LFU (least frequently used) to locally manage distributed caches in order to improve cache hit ratios. Other conventional solutions use random linear network coding to transfer packets in groups, which may improve throughput in capacity-limited networks.

However, conventional network caching and network coding solutions do not consider the relative efficiency of caching and transmission resources. This leads to suboptimal cost per delivered object or file. Moreover, conventional content delivery solutions do not exploit the possible combined benefits of network caching and network coding.

SUMMARY

At least one example embodiment is directed to caching and/or delivery methods and/or devices in a communications network. This leads to suboptimal cost per delivered object or file. Moreover, conventional content delivery solutions do not exploit the possible combined benefits of network caching and network coding.

According to at least one example embodiment, a method for transmitting data files in a network includes receiving requests from user devices for packets of the data files. The method includes constructing a conflict graph such that each packet requested by each user device is represented by a distinct vertex in a plurality of vertices of the conflict graph, the constructing being based on which of the plurality of vertices represent a same requested packet and which requested packets are stored in caches belonging to the user devices. The method includes coloring the plurality of vertices of the conflict graph to label the requested packets. The method includes combining the packets represented by vertices having a same color. The method includes sending the combined packets.

According to at least one example embodiment, the constructing includes creating a link between a first and a second of the plurality of vertices if (i) the first and second vertices do not represent a same packet, and (ii) a packet represented by the first vertex is not stored in a cache of a user device requesting a packet represented by the second vertex, or the packet represented by the second vertex is not stored in a cache of a user device requesting the packet represented by the first vertex.

According to at least one example embodiment, the coloring includes determining possible assignments of colors to the plurality of vertices. Each of the assignments are determined such that any two linked vertices do not have the same color. The coloring includes selecting the assignment of colors that results in a minimum number of colors for the conflict graph.

According to at least one example embodiment, the combining performs an exclusive-OR operation or other linear combination operation over a finite field on the packets represented by the vertices having the same color.

According to at least one example embodiment, the constructing constructs a directed conflict graph by creating a directed link from a first vertex in the plurality of vertices to a second vertex in the plurality of vertices if (i) the first and second vertices do not represent a same packet, and (ii) the packet represented by the second vertex is not stored in the cache of the user device requesting the packet represented by the first vertex.

According to at least one example embodiment, the coloring includes determining possible assignments of colors to the plurality vertices of the directed conflict graph such that any two linked vertices do not have the same color. The coloring includes selecting the assignment of colors that results in a minimum number of colors used to color a maximum closed outgoing neighborhood across the plurality of vertices.

According to at least one example embodiment, the closed outgoing neighborhood of the first vertex is a subset of the plurality of vertices, and the subset of vertices are connected by a directed link from the first vertex in the directed conflict graph.

According to at least one example embodiment, the combining includes constructing a parity matrix of an MDS code based on a total number of colors in the selected assignment and the minimum number of colors in the maximum closed outgoing neighborhood across the plurality of vertices. The combining includes allocating vectors of the parity matrix based on the packets represented by the vertices having the same color, and combining the packets represented by the vertices having the same color based on the allocated vectors.

According to at least one example embodiment, the method includes assigning the plurality of vertices to levels, each level indicating a number of requests for packets and a number of user device caches storing the packets, and the coloring colors the plurality of vertices based on the assigned levels.

According to at least one example embodiment, each level is a sum of the number of user devices requesting a packet and the number of user device caches storing the requested packet.

According to at least one example embodiment, the coloring includes selecting an uncolored vertex in the plurality of vertices, and assigning a same color to the uncolored vertex and other uncolored vertices in the plurality of vertices that (i) have a same level as the uncolored vertex, (ii) do not have a link to the uncolored vertex, and (iii) do not have a link between each other.

According to at least one example embodiment, the coloring includes repeatedly performing the coloring until the plurality of vertices are colored.

It should be understood that the above methods may be performed by a network element (e.g., a content source).

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of example embodiments.

DETAILED DESCRIPTION OF EXAMPLE EMBODIMENTS

Figure 1:
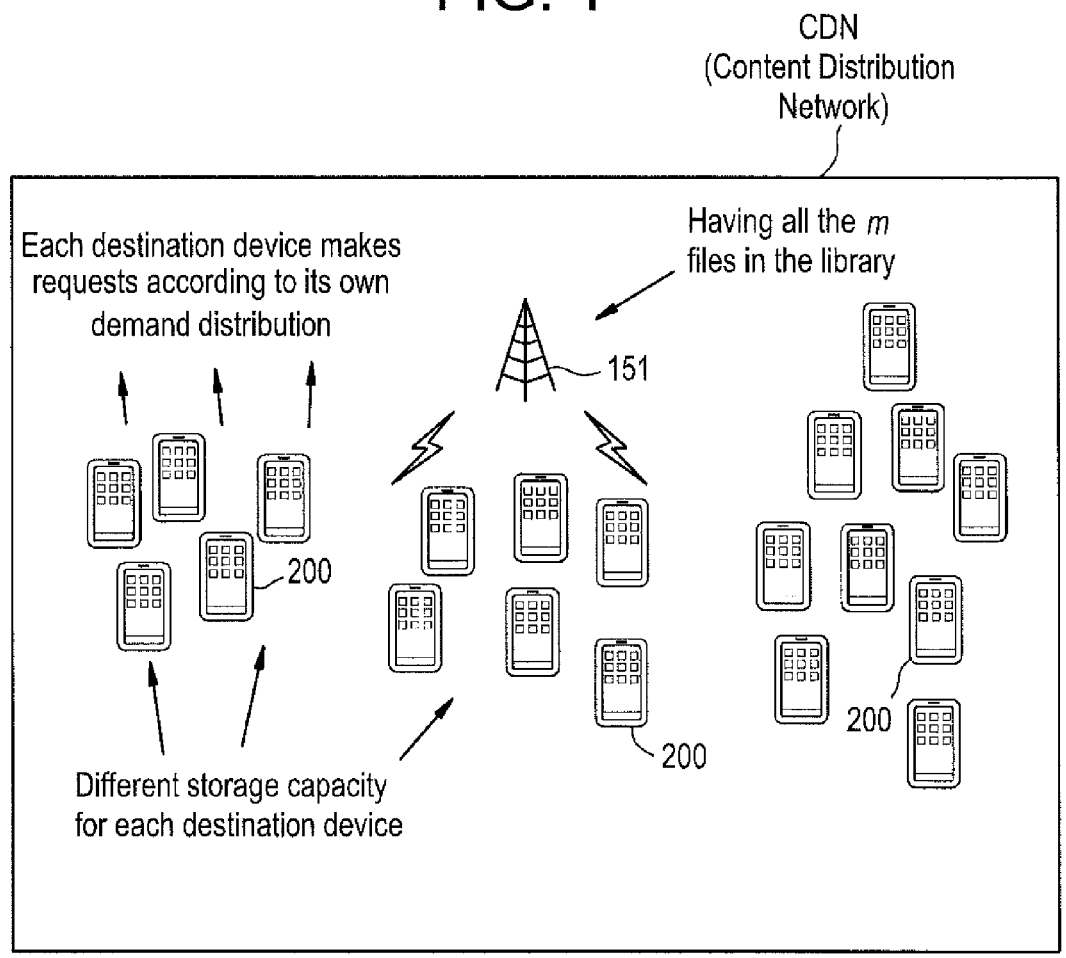
FIG. 1 shows a content distribution network according to at least one example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., base stations, base station controllers, NodeBs eNodeBs, etc.). Such existing hardware may include one or more Central Processors (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a special purpose processor or special purpose processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 shows a content distribution network according to at least one example embodiment.

As shown in FIG. 1, a content distribution network (CDN) may include the network element 151 connected to a plurality of destination devices 200. The network element 151 may be a content source (e.g., a multicast source) for distributing data files (e.g., movie files). The destination devices 200 may be end user devices requesting data from the content source. For example, each destination device 200 may be part of or associated with a device that allows for the user to access the requested data. For example, each destination device 200 may be a set top box, a personal computer, a tablet, a mobile phone, or any other device associated used for streaming audio and video. Each of the destination devices 200 may include a memory for storing data received from the network element 151. The structure and operation of the network element 151 and destination devices 200 will be described in more detail below with reference to FIGS. 2 and 3.

Figure 2:
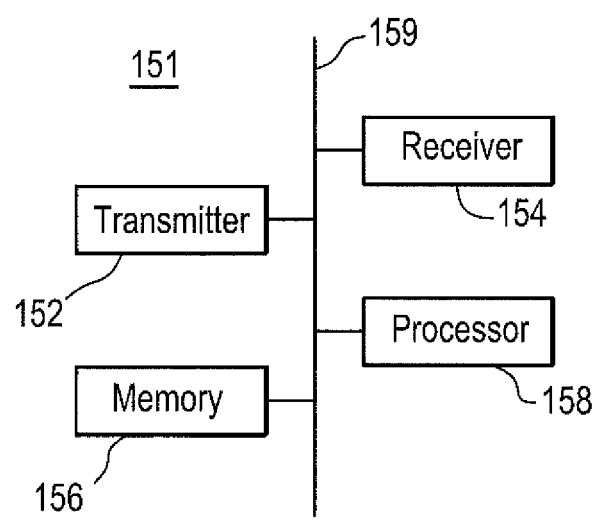
FIG. 2 is a diagram illustrating an example structure of network element according to an example embodiment.

FIG. 2 is a diagram illustrating an example structure of network element according to an example embodiment. According to at least one example embodiment, the network element 151 may be configured for use in a communications network (e.g., the content distribution network (CDN) of FIG. 1). Referring to FIG. 2, the network element 151 may include, for example, a data bus 159, a transmitter 152, a receiver 154, a memory 156, and a processor 158. Although a separate description is not included here for the sake of brevity, it should be understood that each destination device 200 may have the same or similar structure as the network element 151.

The transmitter 152, receiver 154, memory 156, and processor 158 may send data to and/or receive data from one another using the data bus 159. The transmitter 152 is a device that includes hardware and any necessary software for transmitting wireless signals including, for example, data signals, control signals, and signal strength/quality information via one or more wireless connections to other network elements in a communications network.

The receiver 154 is a device that includes hardware and any necessary software for receiving wireless signals including, for example, data signals, control signals, and signal strength/quality information via one or more wireless connections to other network elements in a communications network.

The memory 156 may be any device capable of storing data including magnetic storage, flash storage, etc.

The processor 158 may be any device capable of processing data including, for example, a special purpose processor configured to carry out specific operations based on input data, or capable of executing instructions included in computer readable code. For example, it should be understood that the modifications and methods described below may be stored on the memory 156 and implemented by the processor 158 within network element 151.

Further, it should be understood that the below modifications and methods may be carried out by one or more of the above described elements of the network element 151. For example, the receiver 154 may carry out steps of "receiving," "acquiring," and the like; transmitter 152 may carry out steps of "transmitting," "outputting," "sending" and the like; processor 158 may carry out steps of "determining," "generating", "correlating," "calculating," and the like; and memory 156 may carry out steps of "storing," "saving," and the like.

It should be understood that example embodiments are directed to a caching phase (described below with reference to FIGS. 3A and 3B) and a delivery phase (described below with reference to FIGS. 4-8).

FIGS. 3-8 are flow charts illustrating example operations of the network element in FIG. 2. For example, FIGS. 3A-3B show example operations for carrying out a method of caching in a communications network. FIGS. 4-8 show example operations for delivering data files after the caching method has been performed.

Figure 3A:
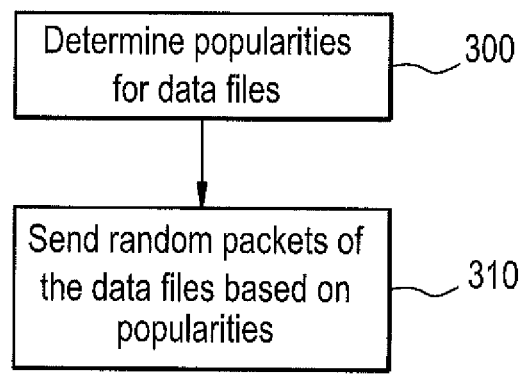
FIGS. 3A-3B are flow charts illustrating example operations of the network element in FIG. 2.
Figure 3B:
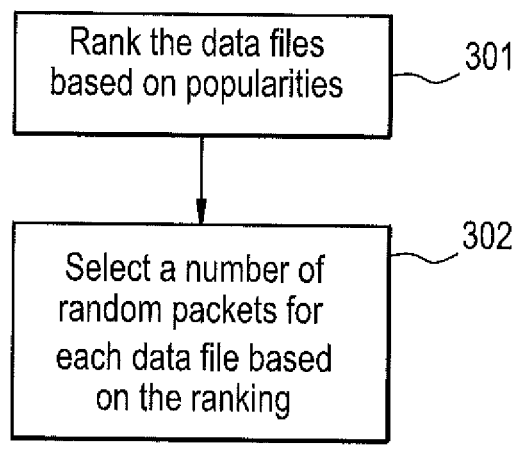

It should be understood that FIGS. 3A-3B are for carrying out a caching distribution method related to Algorithm 1 below, where each data file 'f' is divided into 'B' equal-size packets represented as symbols of a finite field and belongs to library 'F':

---
Algorithm 1: Caching algorithm
---
1    for f ∈ F →
2        Each user u caches a subset of
    $p_{f,u}M_uB$ distinct packets of file f
uniformly at random;
3        endfor
4        M = {$M_{u,f}$, with u = 1,•••,n,and f = 1,•••,m};
5    return(M );
end Caching algorithm

---

In Algorithm 1, '$p_u = [p_{u,1}, \ldots p_{u,m}]$' is the caching distribution of the 'u' destination device 200, where $\Sigma_{f=1}^{m} p_{f,u} = 1$, $\forall u$ with $u=1, \ldots, n$, and $0 \leq p_{f,u} \leq 1/M_u, \forall f = 1, \ldots, m, u=1, \ldots, n$, 'm' is the number of files hosted by the network element 151, and '$M_u$' is the storage capacity of the cache at destination device 'u' (i.e., destination device 200) and $M_{u,f} = p_{f,u}M_uB$ denotes the packets of file f cached at user u. The network element 151 carries out Algorithm 1 such that destination, 'u', device 200 caches $M_{u,f} = p_{f,u}M_uB$ packets of file 'f'. Furthermore, the randomized nature of Algorithm 1 allows network element 151 to perform operations such that, if two destinations caches the same number of packets for a given file 'f',then each of the two destination device 200 caches different packets of the same file 'f'. Algorithm 1 may be implemented by network element 151 according to the operations described in FIGS. 3A-3B below.

Referring to FIG. 3A, in operation 300, the network element 151 may determine popularities for a plurality of data files. The data files may be, for example, video and/or audio files. The network element 151 may determine the popularities based on requests for the plurality of data files from at least one of destination devices 200 (e.g., user requests). The user requests may form a demand distribution for the data files. The network element 151 may determine the popularities according to a demand distribution of all the destination devices 200. In this case, the demand distribution may follow a Zipf distribution. Alternatively, the network element 151 may determine the popularities on a per destination device basis where each destination device 200 has as associated demand distribution.

The network element 151 may determine the popularities based on a number of requests for the data files from the destination devices 200. For example, the network element 151 determines a data file that is requested 100 times by the destination devices 200 as having a higher popularity than a data file that is requested 50 times. Thus, the popularities may be based on which data files are most often requested and viewed by users of the destination devices 200.

The network element 151 may divide each data file into a plurality of packets. For example, the network element 151 may divide each data file in to a same number of packets (e.g., three packets). Accordingly, in operation 310, the network element 151 may send random packets of the plurality of data files to at least one destination device based on the popularities determined in operation 300. For example, the network element 151 may send random packets of each data file to destination devices 200 such that the random packets are stored (or cached) at each destination device 200.

The network element 151 may send the random packets such that each destination device 200 receives a given number of random packets for at least one of the data files based on the determined popularities and input parameters (e.g., number of destination devices, popularity distribution, cache size of each destination device, size of the data file library at network element 151, etc.). For example, the network element 151 may send a same number of packets to each destination device 200 if the destination devices 200 have a same size cache and a same demand distribution (e.g., the destination devices are homogeneous). In one example, assume that there are two destination devices 1 and 2 and two files A and B, divided into ten packets. If (i) destination devices 1 and 2 request file A and file B with the same frequency and file A is requested by both destinations with more frequency than file B, and (ii) the two destination devices 1 and 2 have the same cache size, for example six units in terms of packets, then the network element 151 will perform the caching method such that both destination devices 1 and 2 cache four packets of file A and two packets of file B.

If the network element 151 determined the popularities on a per destination device basis in operation 300, then the network element 151 may send the random packets on a per destination device basis in operation 310. For example, the network element 151 may send a different number of packets to each destination if the destinations devices 200 have different size caches or different demand distributions. In this case, referring to the example above, destination device 1 could receive seven packets of file A and three packets of file B while destination device 2 could receive two packets of file A and five packets of file B. This could be due the fact that destination device 1 requests file A much more than file B and has total cache size of ten units in terms of packets, while destination 2 device requests file A much less than file B and has a total cache size of seven units in terms of packets.

FIG. 3B illustrates example operations of the network element 151 that may be carried out between operations 300 and 310, if desired. For example, following operation 300 in FIG. 3A, the network element 151 may rank the data files based on the determined popularities. For example, in operation 301, the network element 151 may rank the data files from a most popular data file to a least popular data file using the popularities determined in operation 300.

In operation 302, the network element 151 may select, for each data file, a number of random packets based on the ranking. For example, the network element 151 selects a different number of random packets for each of the data files according at least one of a respective rank of each data file and input parameters of the network (e.g., number of destination devices, popularity distribution, cache size of each destination device, size of the data file library at network element 151, etc.). After operation 302, the network element 151 may proceed back to operation 310 in FIG. 3A to send the selected number of random packets for each data file.

It should be appreciated that operation 302 may include the network element 151 dividing the ranked data files into at least a first subset and a second subset based on at least one threshold value. The at least one threshold value may be based on empirical evidence and/or user defined. The first subset may contain higher ranked data files than the second subset. Thus, in operation 310, the network element 151 may send the selected number of random packets for only the data files in the first subset. This may allow for a more efficient caching of the packets at the destination devices 200.

It should be understood that the operations described with reference to FIGS. 3A and 3B allow for improved performance of the network because of the scheme's ability to cache more packets of the more popular files and increase (or alternatively, maximize) the amount of distinct packets of each file collectively cached by the destination devices 200.

In conjunction with the above described caching methods, this application discloses example methods for a delivery phase in which requested packets of data files are delivered to destination devices 200. Example methods for the delivery phase are based on graph theory.

Figure 4:
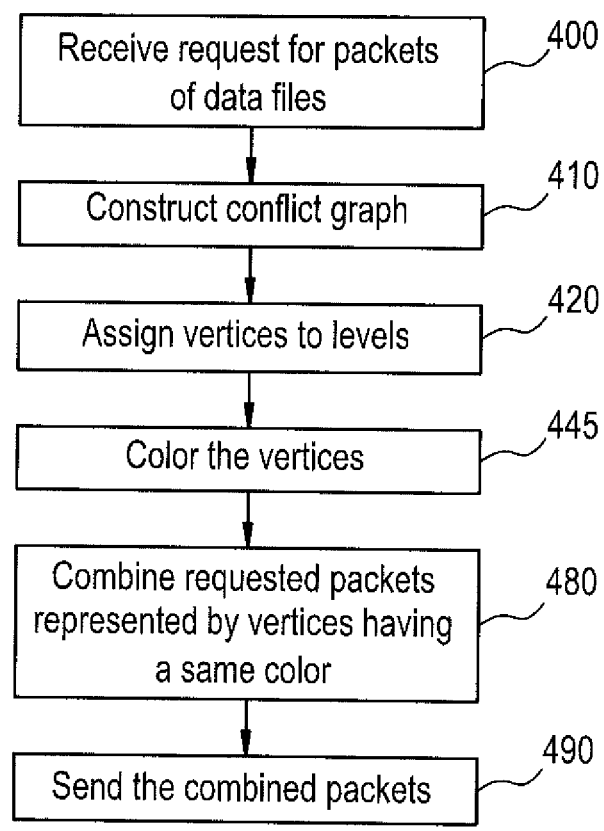
FIG. 4 illustrates example operations for a delivery phase according to at least one example embodiment.

FIG. 4 illustrates example operations for a delivery phase according to at least one example embodiment. With reference to FIG. 4, in operation 400, the network element 151 receives requests from destination devices 200 (or user devices) for packets of the data files. Since the network element 151 has already performed the caching method described above, each destination device 200 requests only those packets that were not cached (or stored) as a result of the caching method. Thus, the delivery phase consists of providing to each destination device 200 the missing part(s) of the requested files, i.e., the packets missing from that destination device's 200 memory.

In operation 410, the network element 151 constructs the conflict graph. For example, the network element 151 populates a conflict graph with a plurality of vertices such that each packet requested by each destination device 200 is represented by a distinct vertex in a plurality of vertices of the conflict graph. Thus, even if a same packet is requested by K different users, the packet is represented as K different vertices in the conflict graph. Further, the network element 151 may construct the conflict graph based on which of the plurality of vertices represent a same requested packet and which requested packets are stored in caches belonging to the destination devices 200. Operation 410 is described in further detail below with reference to FIGS. 5 and 6.

Still referring to FIG. 4, in operation 420, the network element 151 may assign the plurality of vertices to levels. Each level may indicate a number of requests for packets and a number of user destination 200 caches storing the packets. For example, each level may be a sum of the number of user destinations requesting a packet and the number of user device caches storing the requested packet. Thus, if a packet is requested by 4 destinations devices 200 and 3 of the destinations devices 200 are storing the packet, then the level for the vertex associated with that packet is 3+4=7.

Figure 7A:
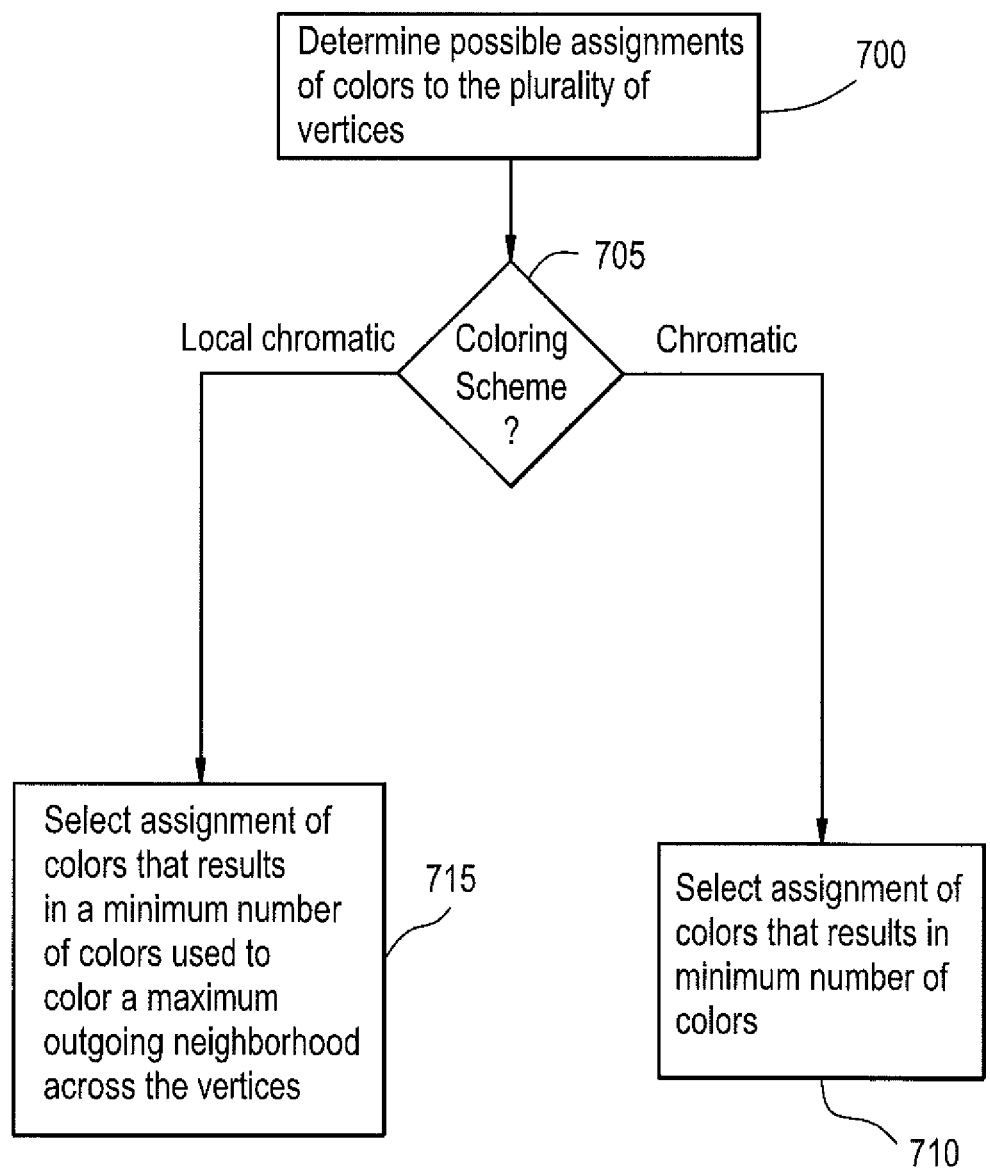
FIGS. 7A and 7B describe example operations for coloring a conflict graph according to at least one example embodiment.
Figure 7B:
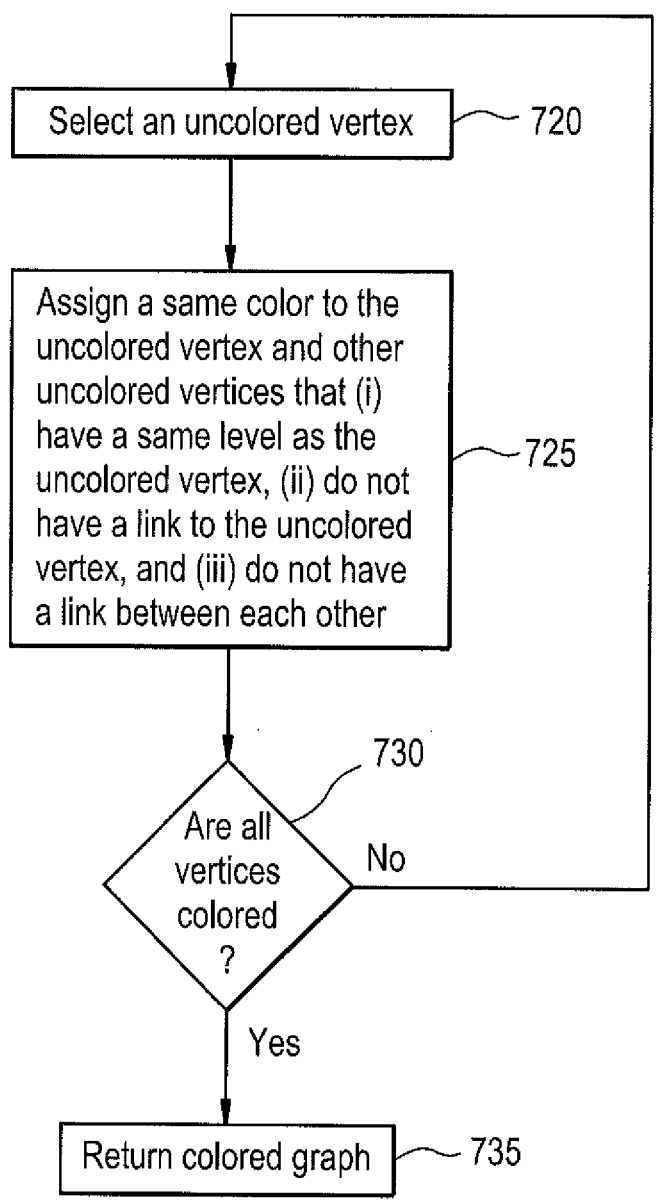

It should be understood that operation 420 is an optional operation in FIG. 4. For example, operation 420 may be performed or not performed based on how the network element 151 will perform the coloring operation in operation 445. For example, the network element 151 may perform operation 420 if the coloring operations of FIG. 7B are selected. The network element 151 will skip operation 420 if the coloring operations of FIG. 7A are selected.

Still referring to FIG. 4, in operation 445, the network element 151 colors the plurality of vertices as a way of labeling the requested packets on the conflict graph. Operation 445 is discussed in further detail below with respect to FIGS. 7A and 7B.

In operation 480, the network element 151 combines the requested packets represented by vertices having a same color. For example, the network element 151 performs an exclusive-OR operation (or other linear combination operation over a finite field) on the packets represented by the vertices having the same color. Operation 480 is discussed in further detail below with respect to FIG. 8.

In operation 490, the network element 151 sends the combined packets. For example, the network element 151 sends the combined packets to the destination devices 200 via a multicast transmission. By combining packets prior to transmission it should be understood that delivery methods according to at least one example embodiment may reduce the number of transmissions of the network element 151 which may reduce consumption and improve network efficiency.

Figure 5:
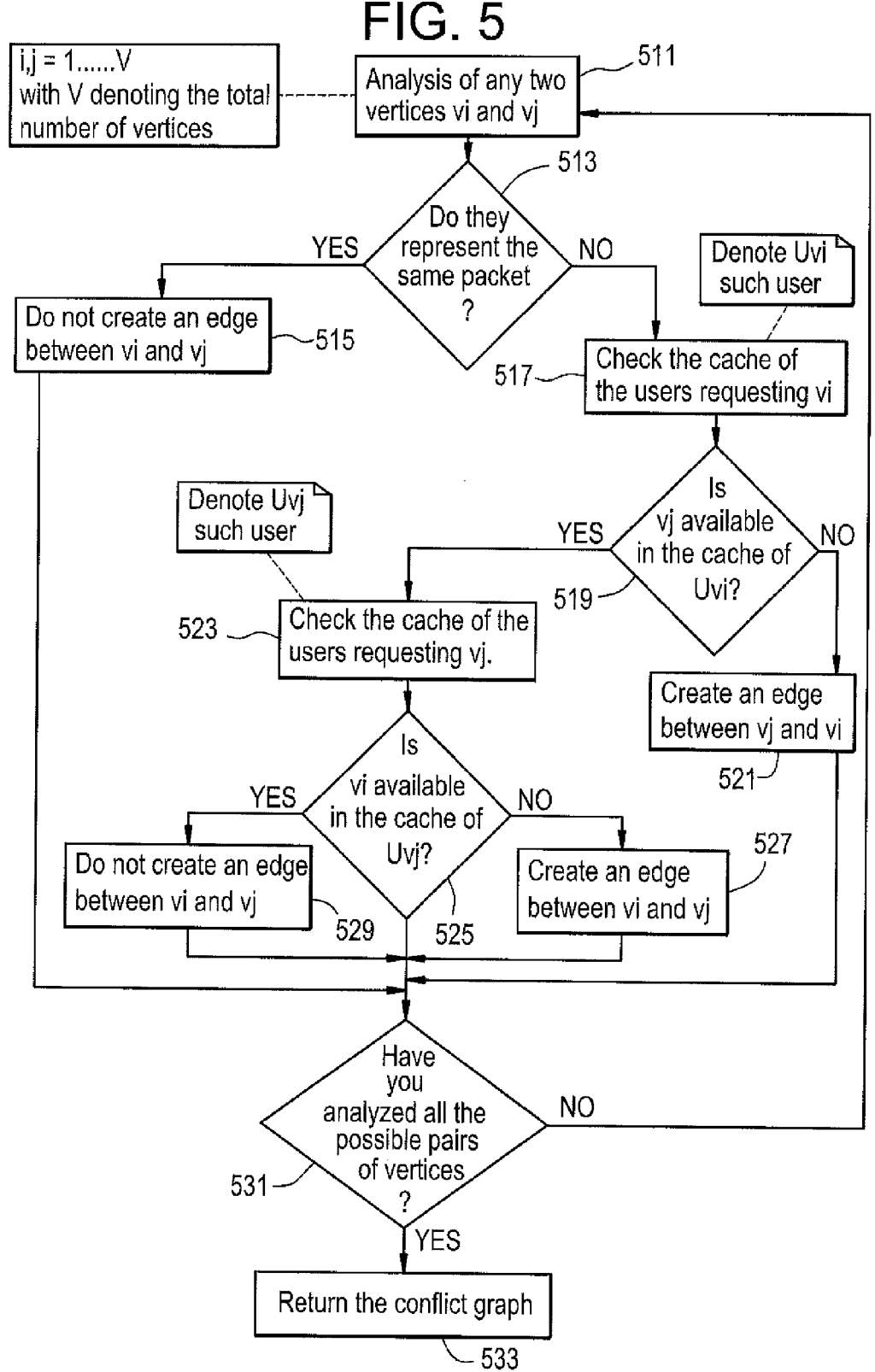
FIG. 5 illustrates example operations for constructing an undirected conflict graph according to at least one example embodiment.
Figure 6:
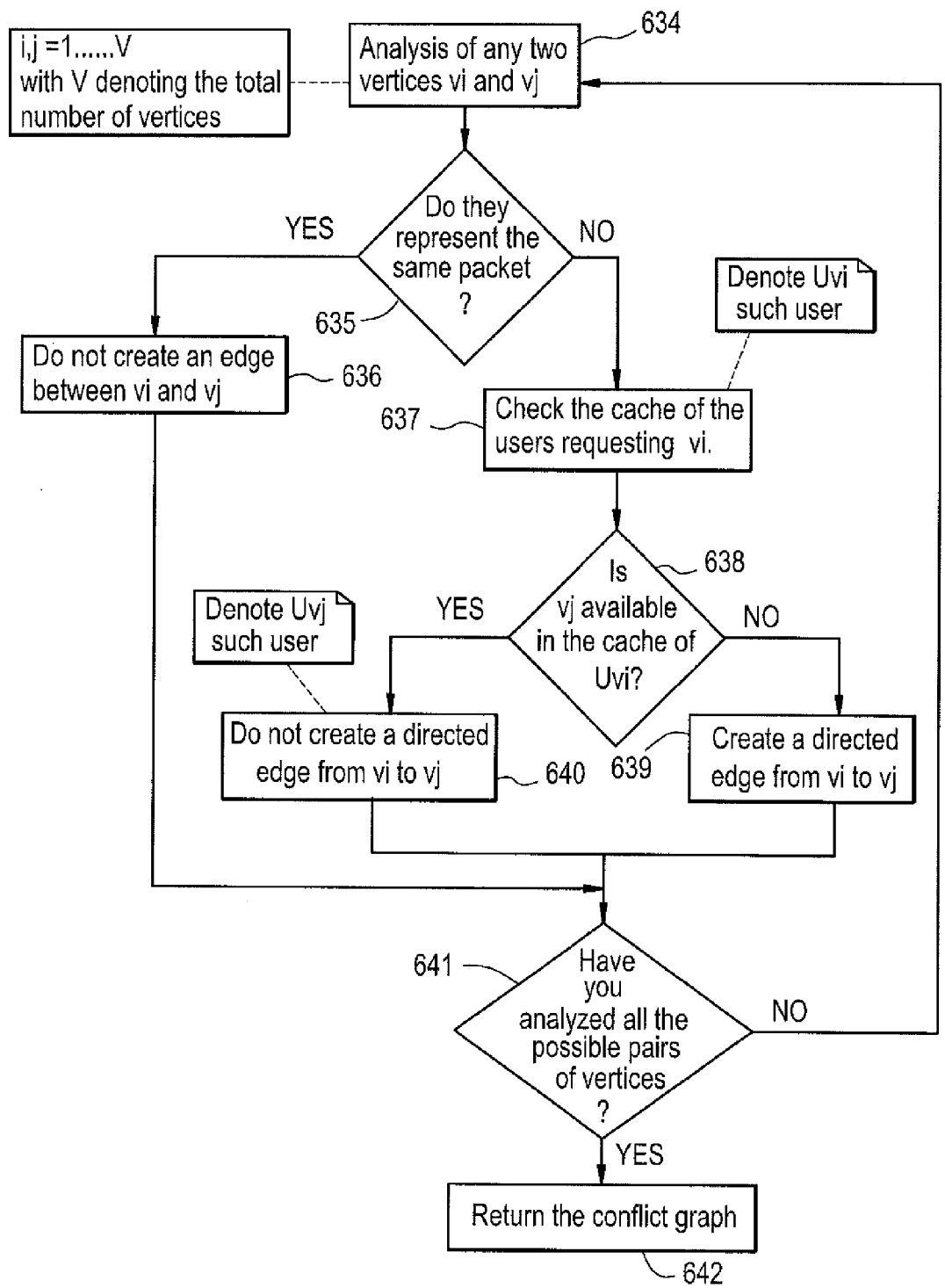
FIG. 6 illustrates example operations for constructing a directed conflict graph according to at least one example embodiment.

FIGS. 5 and 6 illustrate example operations for constructing a conflict graph according to at least one example embodiment. For example, FIGS. 5 and 6 discuss operation 410 from FIG. 4 in further detail. FIG. 5 illustrates example operations for constructing an undirected conflict graph while FIG. 6 illustrates example operations for constructing a directed conflict graph. The undirected conflict graph may be used in conjunction with a coloring scheme referred to in this application as a chromatic number scheme and a coloring scheme referred to a greedy constrained (GCC) coloring scheme. The directed confilct graph may be used in conjunction with a coloring scheme referred to in this application as a local chromatic number scheme. These coloring schemes are described in more detail below with reference to FIGS. 7A and 7B.

Referring to FIG. 5, in operation 511, the network element 151 analyzes two vertices 'Vi' and Vj' from the plurality of vertices populated in operation 410. If, in operation 513, the network element determines that vertices Vi and Vj represent a same requested packet, then the network element 151 does not create a link (or edge) between the two vertices in operation 515. Then, the network element 151 proceeds to operation 531 to determine whether all of the vertices in the conflict graph have been analyzed.

If, in operation 513, the network element 151 determines that the vertices Vi and Vj do not represent a same requested packet, then the network element 151 proceeds to operation 517 and checks the cache (or memory) of the destination devices 200 that are requesting the packet represented by vertex Vi. If, in operation 519, the network element 151 determines that the packet representing vertex Vj is not available in the cache of the destination devices 200 requesting the packet represented by vertex Vi, then the network element 151 creates a link between vertex Vi and vertex Vj in operation 521. Then, the network element 151 proceeds to operation 531 to determine whether all of the vertices in the conflict graph have been analyzed.

If, in operation 519, the network element 151 determines that the packet representing vertex Vj is available in the cache of the destination devices 200 requesting the packet represented by vertex Vi, then the network element 151 checks the cache of the destination devices 200 requesting the packet represented by vertex Vj in operation 523. If, in operation 525, the packet representing vertex Vi is not available in the cache of the destination devices 200 requesting the packet represented by the vertex Vj, then the network element 151 creates a link between vertices Vi and Vj in operation 527 before proceeding to operation 431 to determine whether all of the vertices in the conflict graph have been analyzed.

If, in operation 525, the network element 151 determines that the packet representing vertex Vi is available in the cache of the destination devices 200 requesting the packet represented by the vertex Vj, then the network element 151 does create a link between vertices Vi and Vj in operation 529. Then, the network element 151 proceeds to operation 531 to determine whether all of the vertices in the conflict graph have been analyzed.

Once the network element 151 has analyzed all of the vertices in the conflict graph, then the network element 151 returns the constructed conflict graph in operation 533.

In view of FIG. 5, it should be understood that the constructing operation 410 in FIG. 4 may summarized by an operation of creating a link between a first and a second of the plurality of vertices if (i) the first and second vertices do not represent a same packet, and (ii) the packet represented by the first vertex is not stored in the cache of the user device requesting the packet represented by the second vertex, or the packet represented by the second vertex is not stored in a cache of a user device requesting the packet represented by the first vertex.

FIG. 6 illustrates example operations for constructing a directed conflict graph.

Referring to FIG. 6, in operation 634, the network element 151 analyzes two vertices 'Vi' and 'Vj' from the plurality of vertices populated in operation 410. If, in operation 635, the network element 151 determines that vertices Vi and Vj represent a same requested packet, then the network element 151 does not create a link (or edge) between the two vertices in operation 636 before proceeding to operation 641 to determine whether all of the vertices in the conflict graph have been analyzed.

If, in operation 635, the network element 151 determines that the vertices Vi and Vj do not represent a same requested packet, then the network element 151 proceeds to operation 637 and checks the cache (or memory) of the destination devices 200 that are requesting the packet represented by vertex Vi. If, in operation 638, the packet representing vertex Vj is not available in the cache of the destination devices 200 requesting the packet represented by vertex Vi, then the network element 151 creates a directed link from vertex Vi to vertex Vj in operation 639 before proceeding to operation 641 to determine whether all of the vertices in the conflict graph have been analyzed.

If, in operation 638, the packet representing vertex Vj is available in the cache of the destination devices 200 requesting the packet represented by vertex Vi, then the network element 151 does not create a directed link from vertex Vi to vertex Vj in operation 640.

In operation 641, the network element 151 determines whether all possible pairs have been analyzed and, if not, returns to operation 634. If so, then the network element returns the constructed, directed conflict graph in operation 642.

In view of FIG. 6, it should be understood that the constructing operation 410 in FIG. 4 may summarized by an operation that constructs a directed conflict graph by creating a directed link from a first vertex in the plurality of vertices to a second vertex in the plurality of vertices if (i) the first and second vertices do not represent a same packet, and (ii) the packet represented by the second vertex is not stored in the cache of the user device requesting the packet represented by the first vertex.

FIGS. 7A and 7B describe example operations for coloring a conflict graph according to at least one example embodiment. For example, FIGS. 7A and 7B describe operation 445 in FIG. 4 in more detail. For ease of reference, FIG. 7A illustrates two coloring schemes; a chromatic number coloring scheme and a local chromatic number coloring scheme. FIG. 7B illustrates a coloring scheme called greedy constrained coloring (GCC).

With reference to FIG. 7A, in operation 705, the network element 151 may determine possible assignments of colors to the plurality of vertices. For example, the network element 151 may determine each of the assignments of colors such that any two linked vertices do not have the same color. In operation 705, the network element 151 determines the coloring scheme to be used. The determination may be user defined and/or based on empirical evidence. If the network element 151 determines that the chromatic number coloring scheme should be used, then the network element 151 selects the assignment of colors that results in a minimum number of colors for the conflict graph in operation 710. For example, if the network element 151 determines that there are 3 possible assignments that have 4, 5, and 6 colors, respectively, then the network element 151 selects the assignment having 4 colors to color the conflict graph. The chromatic number coloring scheme utilizes the undirected conflict graph constructed according to FIG. 5.

If, in operation 705, the network element 151 determines that the coloring scheme is the local chromatic number coloring scheme, then the network element 151 selects the assignment of colors that results in a minimum number of colors used to color a maximum closed outgoing neighborhood across the plurality of vertices in operation 715. The closed outgoing neighborhood of a particular vertex is defined as a subset of the plurality of vertices that are connected by a directed link from the particular vertex in the directed conflict graph. Thus, this coloring scheme utilizes the directed conflict graph constructed according to FIG. 6. For example, if three assignments have maximum closed outgoing neighborhoods of 4, 5, and 6, respectively, then the network element 151 selects the assignment having the maximum closed outing neighborhood of 4. Here, it should also be understood that the assignment having the maximum closed outgoing neighborhood is not necessarily the assignment with the fewest number of colors.

FIG. 7B illustrates example operations for coloring a conflict graph according to a GCC scheme. The GCC scheme may be performed in conjunction with operation 420 in FIG. 4 and the undirected conflict graph constructed according to FIG. 5. Recall that in operation 420, the network element 151 assigns the plurality of vertices to levels, where each level indicates a number of requests for packets and a number of user destinations 200 storing the packets. Thus, the network element may perform operation 445 by coloring the plurality of vertices based on the assigned levels.

An example algorithm for the GCC scheme is shown below.

| algorithm $GCC_1$ |
|---|
| 1 Let V = V ; |
| 2   Let C = ∅; |
| 3   $c_1$ = ∅; |
| 4   while V ≠ ∅ |
| 5     Pick an arbitrary vertex v in V. Let I = {v}; |
| 6     for all v' ∈ V/{v} → |
| 7       if (There is no edge between v' and I} ∩ {$K_{v'}$ = $K_v$: ∀$\tilde{v}$ ∈ I) then |
| 8         I = I∪v'; |
| 9       endif |
| 10     endfor |
| 11     Color all the vertices in I by c ∉ C; |
| 12     Let $c_1$[I] = c; |
| 13     V = V\I; |
| 14   endwhile |
| 15   return($c_1$); |
| end         $GCC_1$ |

V is the set of all vertices in the undirected conflict graph. $K_v$ denotes the set of users that are either caching or requesting packet v. C is the set of colors used to color the conflict graph and $c_1$ is a vector containing the association between colors and vertices in the conflict graph.

Referring to FIG. 7B and the above algorithm, in operation 720, the network element 151 may select an uncolored vertex from the plurality of vertices of the conflict graph. In operation 725, the network element 151 may assign a same color to the first vertex and other uncolored vertices in the plurality of vertices that (i) have a same level as the first vertex, (ii) do not have a link to the first vertex, and (iii) do not have a link between each other.

In operation 730, the network element 151 determines whether all of the vertices have been colored. If not, then the network element 151 returns to operation 720 until the plurality of vertices are colored. Then, the network element 151 returns the colored conflict graph in operation 735.

Operation 480 from FIG. 4 will now be described in more detail. If the network element 151 colors the vertices using either the chromatic number coloring scheme or the GCC scheme have been performed in operation 445, then the network element 151 may execute operation 480 by performing an exclusive-OR operation (or other linear combination operation over a finite field) on the packets represented by the vertices having the same color. If the network element 151 colors the vertices using the local chromatic number coloring scheme, then the network element 151 may execute operation 480 in accordance with FIG. 8.

Figure 8:
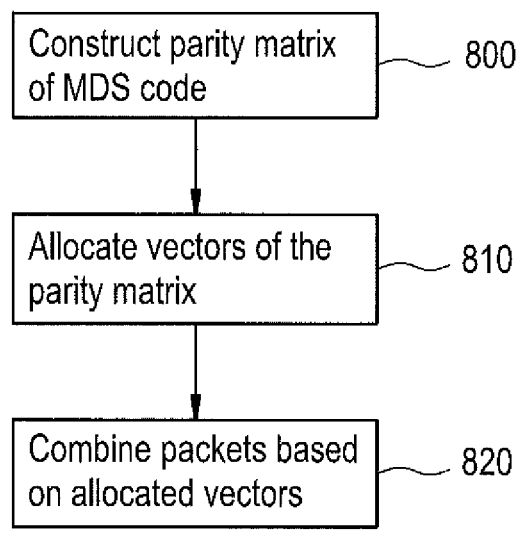
FIG. 8 shows example operations for combining packets according to at least one example embodiment.

FIG. 8 shows example operations for combining packets according to at least one example embodiment.

In operation 800, the network element 151 may construct a parity matrix of a maximum distance separable (MDS) code. For example, the network element 151 may construct the parity matrix of the MDS code based on a total number of colors in the selected assignment (e.g., from operation 715) and the number of colors in the maximum closed outgoing neighborhood across the plurality of vertices. For example, if a total of 6 colors are used to color the conflict graph, but the maximum number of colors locally at each vertex is 5, then the network element constructs a parity matrix V' of a (6, 5) MDS code.

In operation, 810, the network element 151 allocates vectors of the parity matrix based on the packets represented by the vertices having the same color. For example, the network element 151 allocates a same vector to vertices with a same color.

In operation 820, the network element 151 combines the packets represented by the vertices having the same color based on the allocated vectors.

The operations discussed above with respect to FIGS. 4-8 will now be described with respect to FIGS. 9 and 10.

Figure 9:
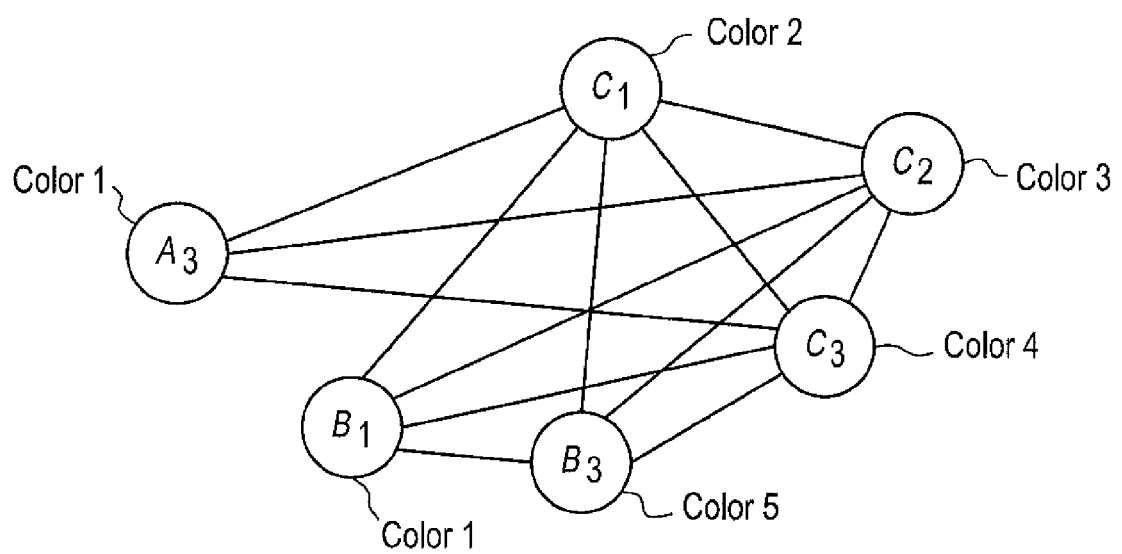
FIG. 9 illustrates a colored conflict graph according to at least one example embodiment.

FIG. 9 illustrates a colored conflict graph according to at least one example embodiment. For example, FIG. 9 shows an undirected conflict graph constructed according to FIG. 5 and colored according to the GCC scheme discussed with reference to FIG. 7B. Variables not defined in the description of FIG. 9 are defined in the description of Algorithm 1 above.

In FIG. 9, we consider a network with n=3 user destinations denoted as U={1,2,3} and m=3 data files denoted as F={A,B,C}. We assume M=1 and divide each file A, B, and C into three packets. For example, file $$A = \{A_1, A_2, A_3\} \cdot \text{Let} \, p_{A,u} = \frac{2}{3}, \, p_{B,u} = \frac{1}{3}$$

and $p_{C,u}=0$ for $u \in \{1,2,3\}$, which means that two packets of A, one packet of B and none of C will be stored in each user destination device's cache. We assume a caching realization M is given by: user destination device 1 caches $\{A_1, A_2, B_1\}$ ($M_{1,A}=\{A_1,A_2\}$, $M_{1,B}=\{B_1\}$, $M_{1,C}=\emptyset$); user destination device 2 caches $\{A_1, A_3, B_2\}$; user destination device 3 caches $\{A_1, A_2, B_3\}$. We let user destination device 1 request file A, user destination device 2 request file B, and user destination device 3 request file C (i.e., f={A,B,C}) such that the request function is W={$A_3, B_1, B_3, C_1, C_2, C_3$}. The resulting conflict graph is constructed according to FIG. 5 and shown in FIG. 9.

As shown in FIG. 9, each of the requested packets is represented by a vertex on the conflict graph, and linked with other vertices in the graph according to the operations set forth in FIG. 5. Using the GCC scheme described with reference to FIG. 7B, the vertices are colored with colors 1 to 5 (i.e., the set of vertices has 5 different colors). As shown in FIG. 9, vertex $A_3$ and vertex $B_1$ have a same color (i.e., color 1). Thus, in accordance with operation 480 in FIG. 4, the network element 151 combines the packets represented by vertices having a same color (i.e., vertex $A_3$ and vertex $B_1$) using, for example, a XOR operation (or by using a linear combination operation over a finite field) and sends the combined packets in operation 490. It should be understood that the vertex coloring in FIG. 9 is the minimum vertex coloring for this scenario and that the resultant number of packet transmissions is 5 because the packets represented by vertex $A_3$ and vertex $B_1$ are transmitted together. It should be further understood that a destination device 200 may decode the combined packets using a set of XOR operations (or a set of other linear combination operations). For example, the destination device 200 may decode combined packets using the packets stored in the cache of the destination device 200 (e.g., as keys).

Figure 10:
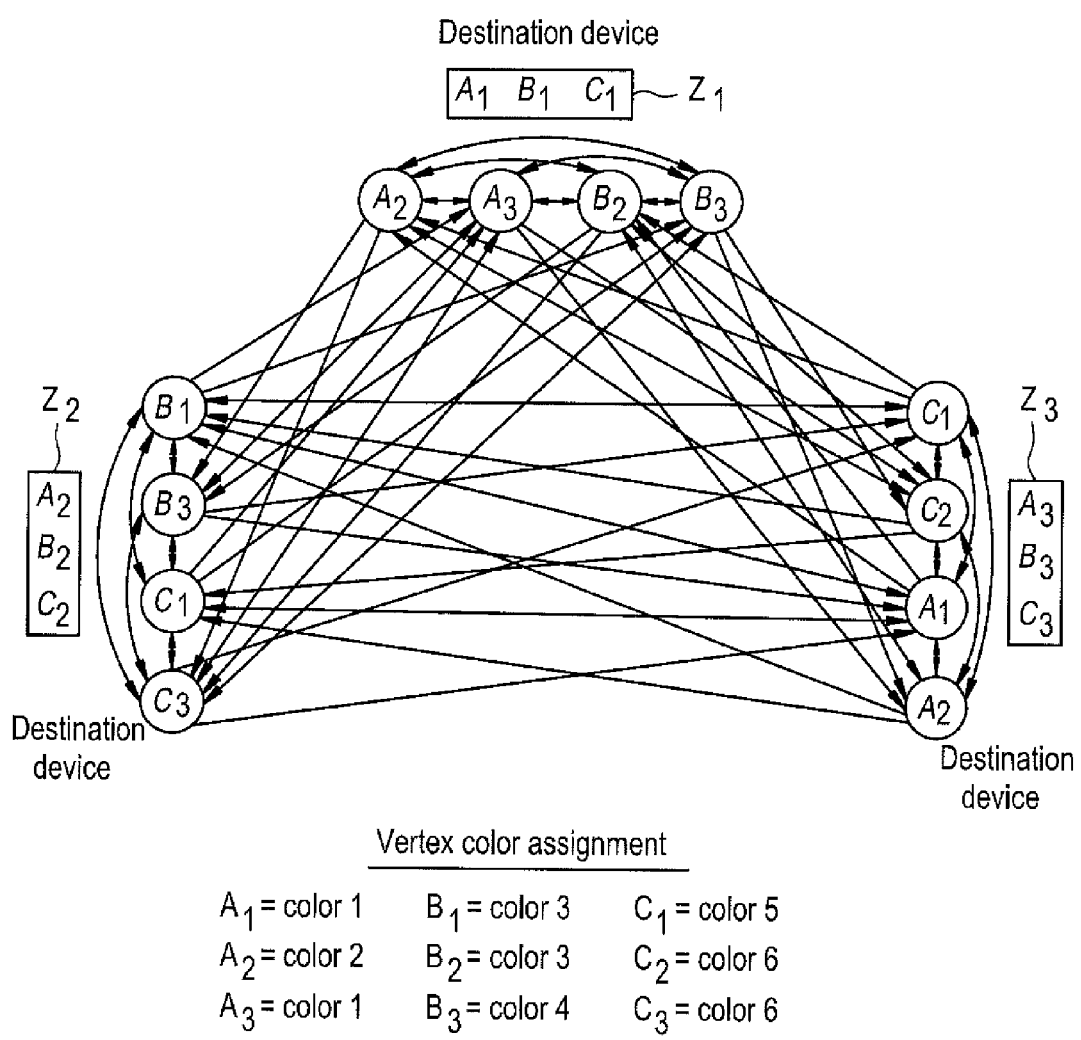
FIG. 10 illustrates a colored conflict graph according to at least one example embodiment.

FIG. 10 illustrates a colored conflict graph according to at least one example embodiment. For example, FIG. 10 shows a directed conflict graph constructed according to FIG. 6 and colored according to the local chromatic number scheme discussed with reference to FIG. 7A. Variables not defined in the description of FIG. 10 are defined in the description of Algorithm 1 and FIG. 9 above.

In FIG. 10, let m=n=3, M=1 and L=2, where L denotes the number of files requested by each user destination device. We denote the files as A,B,C. Each file is divided into $$\binom{3}{1} = 3$$

sub-packets, i.e., A={$A_1,A_2,A_3$}, B={$B_1,B_2,B_3$} and C={$C_1,C_2,C_3$}. Then, the user destination device caches are given by:

$$Z_1=\{A_1,B_1,C_1\}, Z_2=\{A_2,B_2,C_2\}, Z_3=\{A_3,B_3,C_3\}.$$

Let user destination device 1 request files A,B, user 2 request files B,C and user destination device 3 request files C,A. In this case, user destination device 1 requests sub-packets $A_2,A_3,B_2,B_3$. User destination device 2 requests sub-packets $B_1,B_3,C_1,C_3$. User destination device 3 requests sub-packets $C_1,C_2,A_1,A_2$. The resulting conflict graph $H^d$ and the corresponding vertex-coloring is shown in FIG. 10 where we can see that, in total, 6 colors are used but the closed outgoing neighborhood at each vertex is at most 5 colors (i.e., the maximum number of directed links from a particular vertex is 5).

After the conflict graph is constructed and colored, then the network element 151 combines packets in accordance with the operations in FIG. 8. For example, in operation 800, a parity check matrix V' of a (6,5) MDS code is constructed:

$$V' = \begin{pmatrix} 1 & 0 & 0 & 0 & 0 & 1 \\ 0 & 1 & 0 & 0 & 0 & 1 \\ 0 & 0 & 1 & 0 & 0 & 1 \\ 0 & 0 & 0 & 1 & 0 & 1 \\ 0 & 0 & 0 & 0 & 1 & 1 \end{pmatrix}.$$

Then, in operation 810, we allocate the same vector to the vertices (packets) with the same color to obtain:

$$A_1, A_3: \begin{pmatrix}1\\0\\0\\0\\0\end{pmatrix} A_2: \begin{pmatrix}0\\1\\0\\0\\0\end{pmatrix} B_1, B_2: \begin{pmatrix}0\\0\\1\\0\\0\end{pmatrix} C_2, C_3: \begin{pmatrix}0\\0\\0\\1\\0\end{pmatrix} B_3: \begin{pmatrix}0\\0\\0\\0\\1\end{pmatrix} C_1: \begin{pmatrix}1\\1\\1\\1\\1\end{pmatrix}.$$

Then, in operation 820, the combined codeword is given by $A_1 \oplus A_3 \oplus C_1, A_2 \oplus C_1, B_1 \oplus B_2 \oplus C_1, C_2 \oplus C_3 \oplus C_1, B_3 \oplus C_1$, of length 5/3 file units. The user destination devices may decode the received codeword using the packets already stored in their caches. For example, since user destination device 1 has packets $A_1, B_1$, and $C_1$ stored in its cache, the packets $A_2, A_3$ and $B_2, B_3$ are decoded by the user destination device 1 using packets $C_1$ and $B_1$ as keys.

It should be understood that the operations described above allow for improved performance of the network because example embodiments allow for the ability to cache more packets of the more popular files at destination devices 200, increase (or alternatively, maximize) the amount of distinct packets of each file collectively cached by the destination devices 200, and allow coded multicast transmissions within a full set of requested packets of the data files. By combining packets prior to transmission it should be understood that delivery methods and/or devices according to at least one example embodiment may reduce the number of transmissions of the network element 151 which may reduce consumption and improve network efficiency.

Variations of the example embodiments are not to be regarded as a departure from the spirit and scope of the example embodiments. All such variations as would be apparent to one skilled in the art are intended to be included within the scope of this disclosure.

What is claimed is:

1. A method for transmitting data files in a network, comprising:
   receiving requests from user devices for packets of the data files;
   constructing a conflict graph such that each packet requested by each user device is represented by a distinct vertex in a plurality of vertices of the conflict graph, the constructing being based on which of the plurality of vertices represent a same requested packet and which requested packets are stored in caches belonging to the user devices;
   coloring the plurality of vertices of the conflict graph to label the requested packets;
   assigning the plurality of vertices to levels, each level indicating a number of requests for packets and a number of user device caches storing the packets;
   selecting an uncolored vertex in the plurality of vertices;
   assigning a same color to the uncolored vertex and other uncolored vertices in the plurality of vertices that (i) have a same level as the uncolored vertex, (ii) do not have a link to the uncolored vertex, and (iii) do not have a link between each other;
   combining the packets represented by vertices having a same color; and
   sending the combined packets,
   wherein the constructing includes creating a link between a first and a second of the plurality of vertices if (i) the first and second vertices do not represent a same packet, and (ii) a packet represented by the first vertex is not stored in a cache of a user device requesting a packet represented by the second vertex, or the packet represented by the second vertex is not stored in a cache of a user device requesting the packet represented by the first vertex.

2. The method of claim 1, wherein the coloring includes,
   determining possible assignments of colors to the plurality of vertices, each of the assignments being determined such that any two linked vertices do not have the same color, and
   selecting the assignment of colors that results in a minimum number of colors for the conflict graph.

3. The method of claim 1, wherein the combining performs an exclusive-OR operation or other linear combination operation over a finite field on the packets represented by the vertices having the same color.

4. A method for transmitting data files in a network, comprising:
   receiving requests from user devices for packets of the data files;
   constructing a conflict graph such that each packet requested by each user device is represented by a distinct vertex in a plurality of vertices of the conflict graph, the constructing being based on which of the plurality of vertices represent a same requested packet and which requested packets are stored in caches belonging to the user devices;
   coloring the plurality of vertices of the conflict graph to label the requested packets;
   combining the packets represented by vertices having a same color; and
   sending the combined packets,
   wherein the constructing constructs a directed conflict graph by creating a directed link from a first vertex in the plurality of vertices to a second vertex in the plurality of vertices if (i) the first and second vertices do not represent a same packet, and (ii) the packet represented by the second vertex is not stored in the cache of the user device requesting the packet represented by the first vertex,
   the coloring including determining possible assignments of colors to the plurality vertices of the directed conflict graph such that any two linked vertices do not have the same color, and
   selecting the assignment of colors that results in a minimum number of colors used to color a maximum closed outgoing neighborhood across the plurality of vertices.

5. The method of claim 4, wherein the closed outgoing neighborhood of the first vertex is a subset of the plurality of vertices, the subset of vertices being connected by a directed link from the first vertex in the directed conflict graph.

6. The method of claim 5, wherein the combining includes:
   constructing a parity matrix of an MDS code based on a total number of colors in the selected assignment and the minimum number of colors in the maximum closed outgoing neighborhood across the plurality of vertices;
   allocating vectors of the parity matrix based on the packets represented by the vertices having the same color; and
   combining the packets represented by the vertices having the same color based on the allocated vectors.

7. The method of claim 1,
   wherein the coloring colors the plurality of vertices based on the assigned levels.

8. The method of claim 7, wherein each level is a sum of the number of user devices requesting a packet and the number of user device caches storing the requested packet.

9. The method of claim 8, wherein the coloring includes repeatedly performing the coloring until the plurality of vertices are colored.

10. A network element, comprising:
    a processor configured to,
      receive requests from user devices for packets of the data files;
      construct a conflict graph such that each packet requested by each user device is represented by a distinct vertex in a plurality of vertices of the conflict graph, the constructing being based on which of the plurality of vertices represent a same requested packet and which requested packets are stored in caches belonging to the user devices;
      color the plurality of vertices of the conflict graph to label the requested packets;
      assign the plurality of vertices to levels, each level indicating a number of requests for packets and a number of user device caches storing the packets;
      select an uncolored vertex in the plurality of vertices;
      assign a same color to the uncolored vertex and other uncolored vertices in the plurality of vertices that (i)

have a same level as the uncolored vertex, (ii) do not have a link to the uncolored vertex, and (iii) do not have a link between each other;

combine the packets represented by vertices having a same color; and send the combined packets, wherein the processor is configured to construct the conflict graph by creating a link between a first and a second of the plurality of vertices if (i) the first and second vertices do not represent a same packet, and (ii) a packet represented by the first vertex is not stored in a cache of a user device requesting a packet represented by the second vertex, or the packet represented by the second vertex is not stored in a cache of a user device requesting the packet represented by the first vertex.

11. The network element of claim 10, wherein the processor is configured to color the plurality of vertices by:

determining possible assignments of colors to the plurality of vertices, each of the assignments being determined such that any two linked vertices do not have the same color, and selecting the assignment of colors that results in a minimum number of colors for the conflict graph.

12. The network element of claim 10, wherein the processor is configured to combine the packets represented by the vertices having the same color by performing an exclusive-OR operation or other linear combination operation over a finite field.

13. A network element, comprising:

a processor configured to receive requests from user devices for packets of the data files;

construct a conflict graph such that each packet requested by each user device is represented by a distinct vertex in a plurality of vertices of the conflict graph, the constructing being based on which of the plurality of vertices represent a same requested packet and which requested packets are stored in caches belonging to the user devices;

color the plurality of vertices of the conflict graph to label the requested packets combine the packets represented by vertices having a same color; and send the combined packets, wherein the processor is configured to construct the conflict graph as a directed conflict graph, and create a directed link from a first vertex in the plurality of vertices to a second vertex in the plurality of vertices if (i) the first and second vertices do not represent a same packet, and (iii the packet represented by the second vertex is not stored in the cache of the user device requesting the packet represented by the first vertex, the processor being further configured to color the plurality of vertices by, determining possible assignments of colors to the plurality vertices of the directed conflict graph such that any two linked vertices do not have the same color, and selecting the assignment of colors that results in a minimum number of colors used to color a maximum closed outgoing neighborhood across the plurality of vertices.

14. The network element of claim 13, wherein the closed outgoing neighborhood of the first vertex is a subset of the plurality of vertices, the subset of vertices being connected by a directed link from the first vertex in the directed conflict graph.

* * * * *